US008628329B2

(12) United States Patent
Doi

(10) Patent No.: US 8,628,329 B2
(45) Date of Patent: Jan. 14, 2014

(54) PERFECT RHYME RETRIEVAL DEVICE, PERFECT RHYME RETRIEVAL METHOD, PROGRAM REALIZING THE METHOD, AND COMPUTER READABLE RECORDING MEDIUM RECORDING THE PROGRAM

(75) Inventor: Daisuke Doi, Tokyo (JP)

(73) Assignee: Tachikogi Rider Inc., Tokyo (JP)

( * ) Notice: Subject to any disclaimer, the term of this patent is extended or adjusted under 35 U.S.C. 154(b) by 256 days.

(21) Appl. No.: 13/299,299

(22) Filed: Nov. 17, 2011

(65) Prior Publication Data

US 2012/0131054 A1 May 24, 2012

(30) Foreign Application Priority Data

Nov. 18, 2010 (JP) ................................. 2010-258318

(51) Int. Cl.
*G09B 1/00* (2006.01)
*G06F 17/30* (2006.01)
(52) U.S. Cl.
USPC .......................................... 434/167; 707/713
(58) Field of Classification Search
USPC .......... 434/156–159, 167–172; 707/713–721, 707/740–743, 802–805
See application file for complete search history.

(56) References Cited

U.S. PATENT DOCUMENTS

| 6,941,262 | B1 | 9/2005 | Kurzweil et al. |
| 2004/0133559 | A1* | 7/2004 | DeVorzon et al. ................ 707/3 |
| 2006/0095843 | A1* | 5/2006 | Chou ............................ 715/535 |
| 2008/0206724 | A1* | 8/2008 | Volden .......................... 434/178 |
| 2010/0031804 | A1* | 2/2010 | Chevreau et al. ............... 84/609 |
| 2011/0125484 | A1* | 5/2011 | Coen ................................ 704/3 |

OTHER PUBLICATIONS

Web Site of Free Online Rhyming Dictionary at http://www.rhymer.com/, Nov. 15, 2011.

* cited by examiner

*Primary Examiner* — Wilson Lee
(74) *Attorney, Agent, or Firm* — Ditthavong Mori & Steiner, P.C.

(57) ABSTRACT

A function of storing character string information added with vowel or nasal sound information; a function of displaying the character string information from a dictionary function or the character string information to be input; a function of displaying read number information of the displayed character string information; a function of designating and inputting desired positional information to the displayed read number information; a function of changeably setting the positional information regarding the designated and input positional information; a function of retrieving and extracting the character string information from the dictionary function at a position corresponding to the positional information obtained by referring to the changeable positional information, wherein the character string information is coincident with the vowel or the nasal sound information regarding a read of a character corresponding to the designated and input positional information; and a function of outputting and displaying the extracted character string information.

20 Claims, 11 Drawing Sheets

| CHARACTER STRING | | VOWEL SOUND/ NASAL SOUND INFORMATION | MEANING INFORMATION | LEARNING INFORMATION |
|---|---|---|---|---|
| READ | CONVERTED CHARACTER STRING | | | |
| AIOI | ...... | A I O I | NOUN, PLACE NAME ... | 3 |
| AIOI | ...... | A I O I | NOUN | 1 |
| AODAKE | ...... | A O A E | NOUN ... | 2 |
| ARASHI | ...... | A A I | NOUN, ... | 3 |
| ARASHI | ...... | A A I | NOUN FORM OF ADJECTIVE | 2 |
| AWAMORI | ...... | A A O I | ...... | 3 |
| AWAMORI | ...... | A A O I | ...... | 1 |
| ANDON | ...... | A N O N | ...... | 2 |

FIG. 2

PERFECT RHYME RETRIEVAL DEVICE, PERFECT RHYME RETRIEVAL METHOD, PROGRAM REALIZING THE METHOD, AND COMPUTER READABLE RECORDING MEDIUM RECORDING THE PROGRAM

BACKGROUND OF THE INVENTION

1. Field of the Invention

The present invention relates to a technique of retrieving and extracting syllable rhymes of a character string, and particularly relates to a perfect rhyme retrieval device capable of efficiently retrieving and extracting other character string having the same vowel sound (for example, "a", "i", "u", "e", "o") or a nasal sound ("n") as the vowel sound or the nasal sound of particularly an arbitrary character in the character string, a perfect rhyme retrieval method, a program realizing the method, and a computer readable recording medium recording the program.

2. Description of Related Art

Conventionally, in a case of writing lyrics or poems, produced works are well-ordered and attract interests, thus inviting a playful mind and producing high-style writing by syllable rhymes of the character string in the poems or lyrics. Each of the Rap music which has been a mainstream of American music in recent years, poems in British Literature, and Chinese poetry in old times has real presence of itself by syllable rhymes of the character string.

Such a rhyming work is performed by selecting a desired character string after careful consideration and strenuous efforts or by consulting a dictionary by a writer or an editor during writing lyrics or poems.

As described above, conventionally, when syllable rhymes of the character string (perfect rhymes) are found, the writer or the editor needs to extract a desired character string after careful consideration or by consulting a dictionary. Such a work is troublesome because a considerable load is added on the writer or the editor in labor and time, and therefore a suitable skill is required for the writer or the editor. Under such a circumstance, a document preparation work with syllable rhymes is considered to be a special occupational area which depends on a specialist (writers of lyrics or words or editors, etc.)

In recent years, there is a tendency that an ordinary person also writes words or lyrics. However, it is likely to produce works in which a rhyming style is not taken into consideration, thus producing the works not attracting interests and lacking in high style property. Even if the works succeed in rhyming, the ordinary writer or the editor is not accustomed to syllable rhyming during writing lyrics or poems, and such a work becomes painful. Under such a circumstance, even in a case that there is a person who plans to write lyrics or poems, it cannot be denied that such a plan is ended up in failure soon. This is one of the factors of not spreading music software, due to difficulty in writing lyrics.

SUMMARY OF THE INVENTION

The present invention has been made in view of the above-described circumstance, and in order to solve the aforementioned problem, an object of the present invention is to provide a perfect rhyme retrieval device capable of speedily extracting a desired perfect rhyme by anyone with a simple operation, a perfect rhyme retrieval method, a program realizing the perfect rhyme retrieval method, and a computer readable recording medium recording the program.

In order to achieve the aforementioned object, the present invention has structures as follows.

Specifically, the perfect rhyme retrieval device of the present invention includes:

a dictionary unit that stores character string information added with vowel sound information or nasal sound information or both information;

a character string information display unit that displays the character string information extracted from the dictionary unit or the character string information to be input;

a read number information display unit that displays read number information of the character string information displayed on the character string information display unit;

a designating and inputting unit that designates and inputs desired positional information to the read number information displayed on the read number information display unit;

a positional information changing and designating unit that changeably designates the positional information, regarding the positional information extracted from the designating and inputting unit;

a retrieval unit that retrieves and extracts the character string information from the dictionary unit at a position corresponding to the positional information obtained by referring to the positional information extracted from the positional information changing and designating unit, wherein the character string information is coincident with the vowel sound information or the nasal sound information regarding a read of a character corresponding to the positional information extracted from the designating and inputting unit; and a retrieval result display unit that outputs and displays the character string information extracted by the retrieval unit.

In addition to this structure, the present invention further has a structure that the dictionary unit stores meaning information corresponding to the character string information stored therein, and the retrieval unit retrieves and extracts the character string information from the dictionary unit so as to extract meaning information of the extracted character string information, wherein the character string information is coincident with the vowel sound information or the nasal sound information regarding the read of the character, and the retrieval result display unit outputs and displays the meaning information of the character string information extracted by the retrieval unit.

In addition to this structure, the present invention further has a structure that the read number information display unit variably displays icons according to the number of reads.

In addition to this structure, the present invention further has a structure that the dictionary unit has a learning function of storing a frequency of selection that the character string information is selected by the dictionary unit.

According to this structure, a desired perfect rhyme can be speedily and easily extracted. Further, by displaying the icons variably, rhyming positions can be easily changed. Thus, a user-friendly perfect rhyme retrieval technique can be realized.

Further, according to this structure, the meaning information for the extracted perfect rhyme can be displayed, and therefore a suitable perfect rhyme can be speedily and easily selected.

Further, according to this structure, the dictionary unit has the learning function, and therefore the character string information with high selection frequency is preferentially displayed when the perfect rhyme is extracted. Thus, a user-friendly function can be improved.

According to the present invention, a desired perfect rhyme can be easily and speedily extracted, without adding a large load on the writer or the editor in labor and time, with no special skill required. In addition, the rhyming position can be arbitrarily designated, and therefore various perfect rhymes can be speedily retrieved and extracted, in a user-friendly manner for the writer or the editor.

BRIEF DESCRIPTION OF THE DRAWING

FIG. 2 is a view schematically showing an internal structure of a dictionary part according to the embodiment;

DETAILED DESCRIPTION OF EMBODIMENTS

An embodiment of the present invention will be described hereafter, with reference to the drawings.

Figure 1:
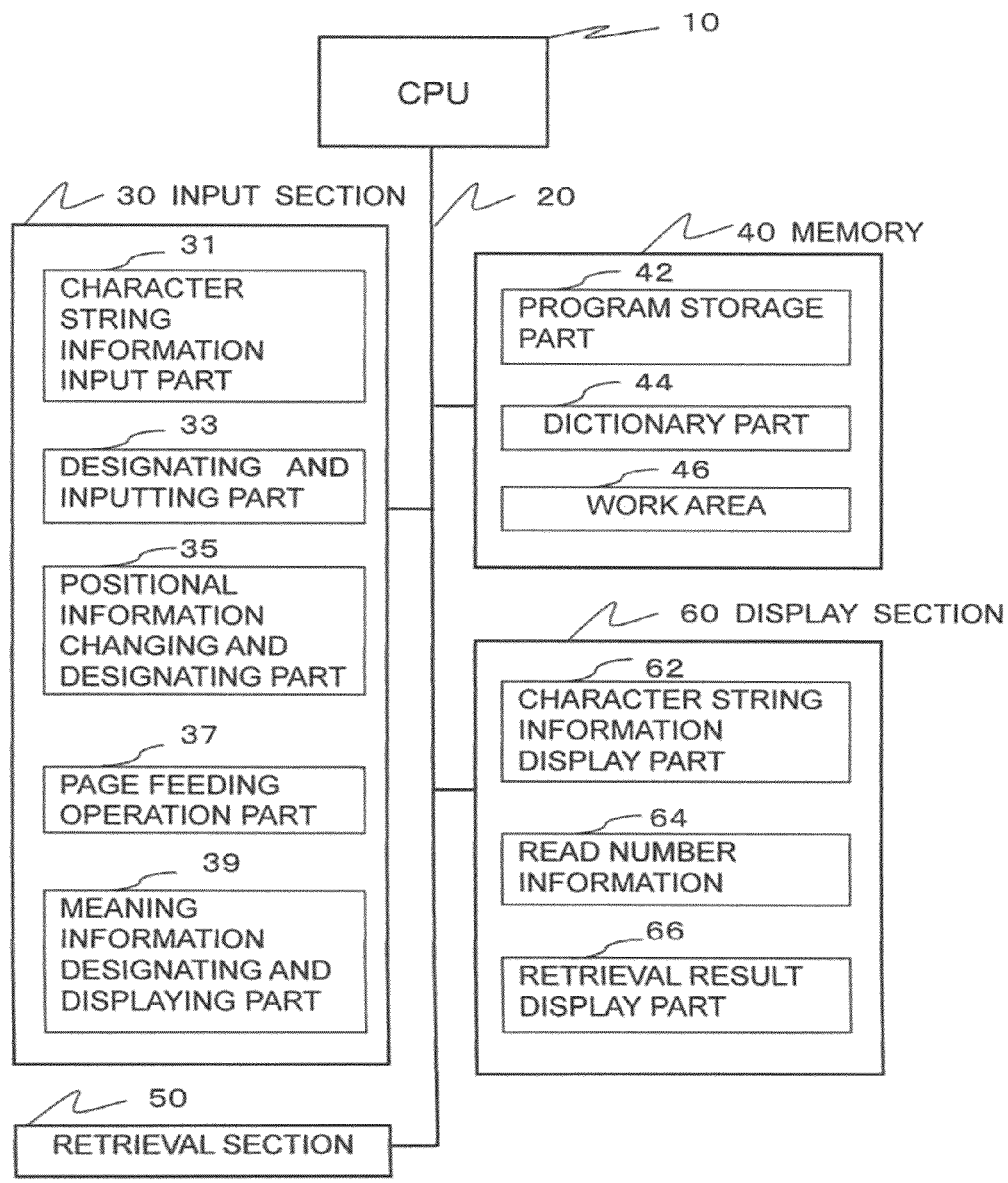
FIG. 1 is a block diagram showing a schematic structure of an entire body of a perfect rhyme retrieval device according to an embodiment of the present invention.

As shown in FIG. 1, a perfect rhyme retrieval device according to the embodiment includes a central processing unit 10 in charge of control processing of the entire system; an input section 30 connected to the central processing unit 10 via a signal line 20; a memory 40; a retrieval section 50, and a display section 60. Thus, the central processing unit 10 performs each kind of control processing while referring to a predetermined program stored in a program storage part 42 provided in a predetermined area of the memory 40 based on input information from the input section 30.

The input section 30 includes a character string information input part 31; a designating and inputting part 33; a positional information changing and designating part 35; a page feeding operation part 37; and a meaning information designating and displaying part 39, and has a function of inputting character string information and designating desired character information in the input character string information (function of designating a rhyming position), and a function of arbitrarily changing, designating, and inputting the rhyming position in the character string information, and a function of operating display information displayed on the display section 60 in each page. Namely, the character string information input part 31 has a function of inputting desired character string information by a pen (not shown). The designating and inputting part 33 has a function of making it possible to arbitrarily designate a rhyming position on a read number information display part 64 displaying the character string information input from the character string information input part 31 and output and displayed on a character string information display part 62 of the display section 60, as read number information of the character string information. Further, the positional information changing and designating part 35 has a function of changeably designating and inputting the rhyming position of the retrieved and extracted character string information, in a case of retrieving and extracting the character string information having a perfect rhyme with a character (a vowel sound or a nasal sound) which is arbitrarily designated by the designating and inputting part 33. In addition, the page feeding operation part 37 has a function of designating and inputting a display control of a screen for feeding or returning the display information in each page, which is output to a retrieval result display part 66 of the display section 60. Further, the meaning information designating and displaying part 39 has a function of designating the meaning information to be displayed, which is included in the character string information, by selecting and designating a desired character string by a pen input, regarding the character string information (perfect rhyme) output and displayed on the retrieval result display part 66.

The memory 40 has a program storage part 42, a dictionary part 44, and a work area 46 in a predetermined area inside, which are referenced and utilized in each kind of control processing. Namely, the program storage part 42 stores each kind of control program referenced when the central processing unit 10 performs each kind of control processing to the perfect rhyme retrieval device of the present invention. The dictionary part 44 is a dictionary that stores the character string information added with vowel sound information ("A", "I", "U", "E", "O") and nasal sound information ("N"). Further, the dictionary of the embodiment is prepared on the assumption of Japanese. When an internal structure of the dictionary part 44 is described with reference to FIG. 2 schematically showing the internal structure, the character string information is arranged in an alphabetical order in the dictionary part 44. The character string information includes read information and converted character string information corresponding to the read information (e. g.: a character string converted to kana-kanji), a vowel sound information and nasal sound information included in character string information, and further meaning information included in each character string information and learning information which takes into consideration a selection frequency or a most recent selection state of the character string information in the perfect rhyme retrieval processing. The dictionary part 44 used in the embodiment is constituted mainly for the purpose of retrieving the perfect rhyme, and is called a rhyming dictionary or a rhyming encyclopedia. Note that a portion of the character string having a long vowel sound, is replaced by the same sound as the immediately preceding vowel sound or the nasal sound and is stored in the dictionary part 44 as the vowel sound information or the nasal sound information. For example, the character string "GOO" is replaced by "UU". The work area 46 has a function of carrying out each kind of work and serves as a work area used for temporarily storing information.

The retrieval section 50 is started based on a command from the central processing unit 10 for retrieving the perfect rhyme. Then, the retrieval section 50 has a function of retrieving and extracting the character string information from the dictionary part 44 at a position corresponding to the positional information by referring to the positional information extracted from the positional information changing and designating part 35, wherein the character string information is coincident with the vowel sound information or the nasal sound information regarding read of the corresponding character.

The display section 60 has a character string information display part 62, a read number information display part 64, and a retrieval result display part 66, and outputs and displays the character string information and the read number information, the result of the perfect rhyme retrieval, and further the meaning information of the selected perfect rhyme. Namely, the character string information display part 62 has a function of displaying the input character string information, and is provided in the same area as the area of character string information input part 31. The read number information display part 64 has a function of displaying the number of reads of the character string information displayed on the character string information display part 62 by the number of square-shaped icons. For example, in a case of the reads "SARETEIRU", the number of reads is 5, and therefore five icons are displayed as a functional structure. Further, for example in a case of "AIOI", the number of reads is 4, and therefore four icons are displayed. The retrieval result display part 66 outputs and displays the result of the perfect rhyme retrieval, wherein the display information is controlled based on the information from the page feeding operation part 37.

Figure 6:
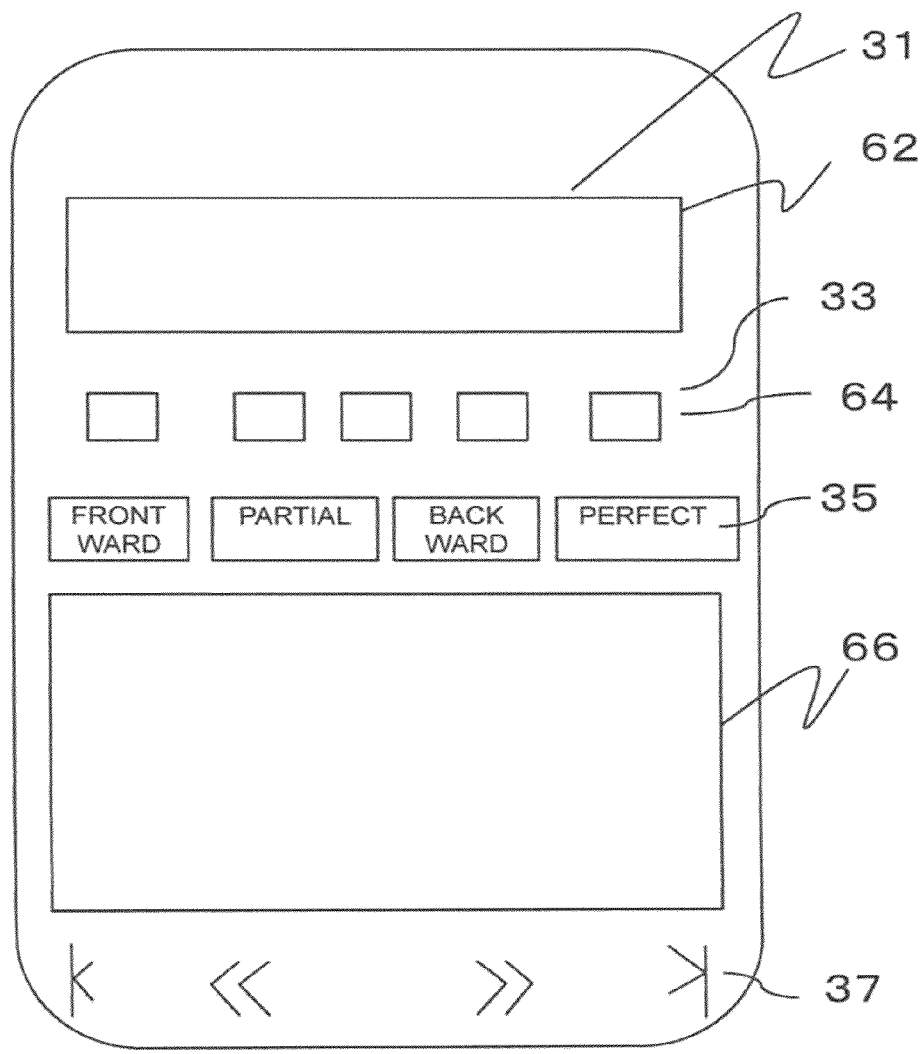
FIG. 6 is a view schematically showing an outer appearance of the perfect rhyme retrieval device according to the embodiment.

Then, an outer appearance structure of the perfect rhyme retrieval device according to the embodiment will be described with reference to FIG. 6. In the perfect rhyme retrieval device of the embodiment, the input section 30 and the display section 60 are constituted integrally with an LCD type touch panel (a touch panel on an upper surface as an input section, and LCD on a lower surface as a display section), wherein the character string information input part 31 and the character string information display part 62 are provided in the same area. Further, the designating and inputting part 33 and the read number information display part 64 are also provided in the same area, wherein square-shaped icons, the number of which are variably output and displayed on the read number information display part 64, are set corresponding to the position of the designating and inputting part 33. Further, the positional information changing and designating part 35 has a square-shaped operation area (operation button) described as "frontward", "partial", "backward", "perfect", and when "frontward" is selected in a perfect rhyme retrieval processing, an operation button of "frontward" is inverted and displayed, and regarding the information (number and position of designated and input reads, namely, number and position of rhymings) input from the designating and inputting part 33, a designation input is carried out so that the character string starting from the vowel sound or the nasal sound designated from the frontward portion (head portion), namely, syllable rhymes of the character string designated from the frontward are retrieved and extracted. Further, when "partial" is selected in the perfect rhyme retrieval processing, an operation button of "partial" is inverted and displayed, and regarding the information input from the designating and inputting part 33, a designation input is carried out so that the character string having the vowel sound or the nasal sound, namely, the syllable rhymes of the character string at an arbitrarily designated position, are retrieved and extracted at an arbitrarily designated position. When "backward" is selected in the perfect rhyme retrieval processing, an operation button of "backward" is inverted and displayed, and regarding the information input from the designating and inputting part 33, a designation input is carried out so that the character string that ends by the vowel sound or the nasal sound designated at a backward portion (end portion), namely, the syllable rhymes of the character string at a backward portion, are retrieved and extracted. Further, when "perfect" is selected in the perfect rhyme retrieval processing, an operation button of "perfect" is inverted and displayed, and regarding the information input from the designating and inputting part 33, the character string having the same vowel sound or the nasal sound as that of each character, namely, the syllable rhymes of the character string are retrieved and extracted. Note that when a perfect rhyme retrieval function is started (initial state), "frontward" is set in a default selected state, and an operation button of "frontward" is inverted and displayed.

An action of the aforementioned structure will be described hereafter.

Figure 3:
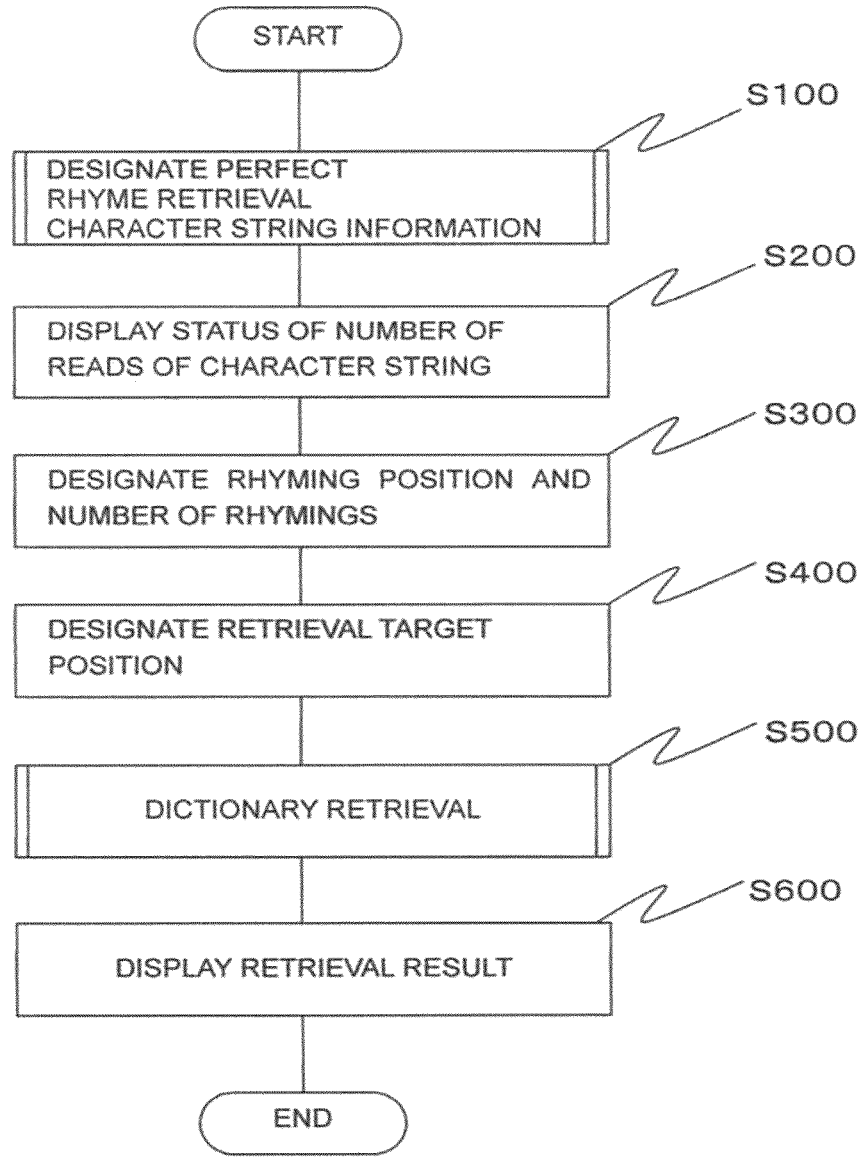
FIG. 3 is a flowchart showing a flow of an overall processing of retrieving a perfect rhyme according to the embodiment.
Figure 7:
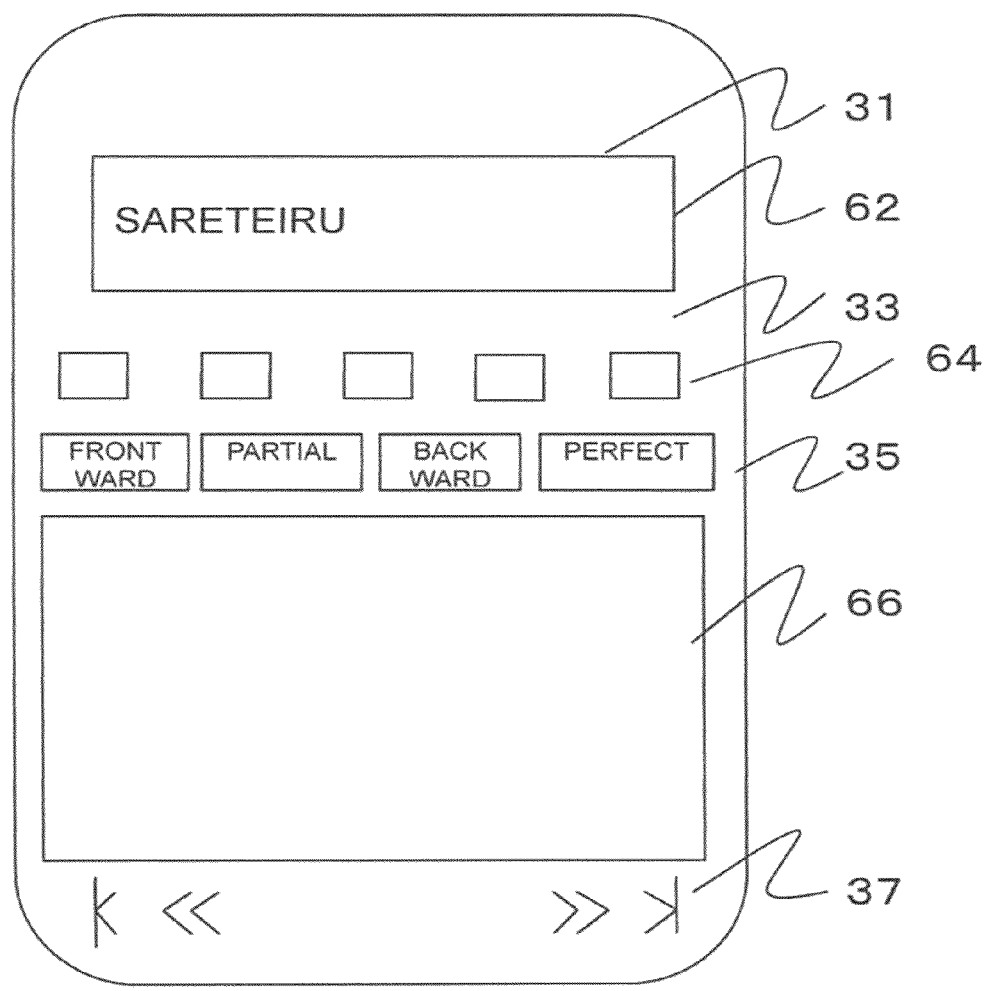
FIG. 7 is a view schematically showing an outer appearance of a state of input processing performed to original data in the perfect rhyme retrieval processing according to the embodiment.
Figure 8:
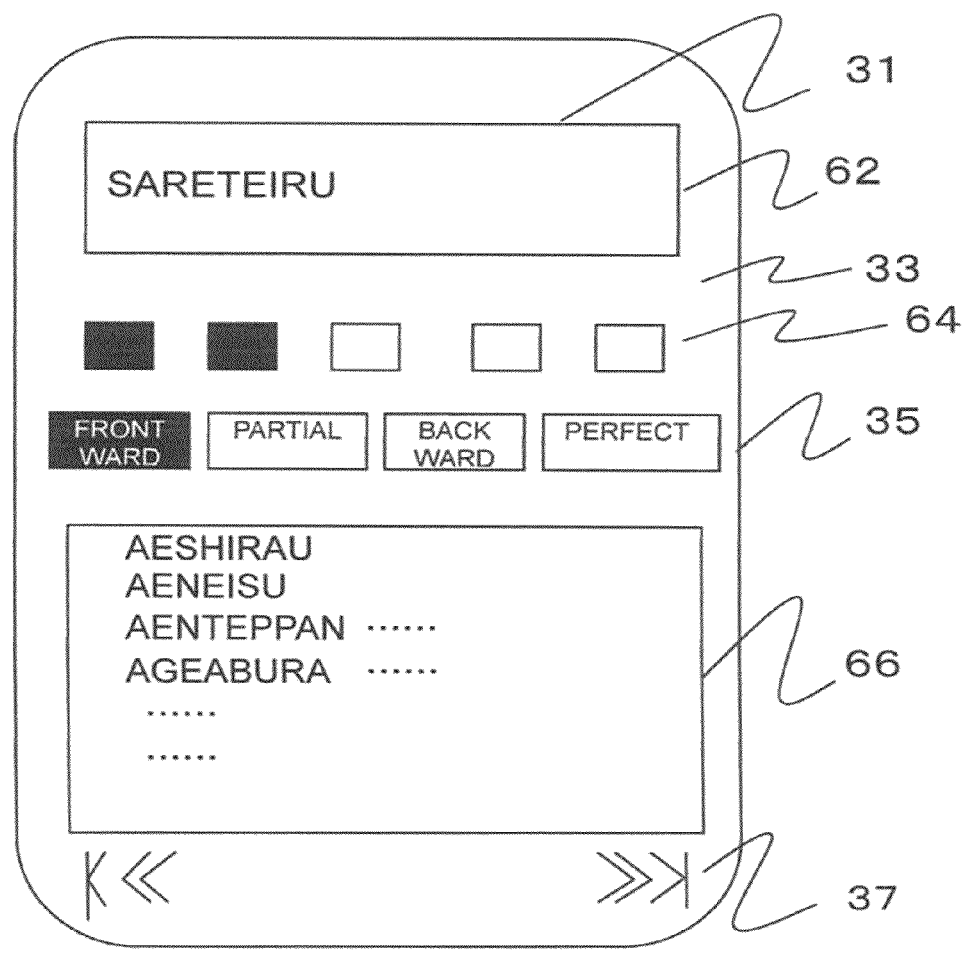
FIG. 8 is a view schematically showing an outer appearance of designating the perfect rhyme and a retrieval result in the perfect rhyme retrieval processing according to the embodiment.

When the perfect rhyme retrieval function is started, the character string information, being original data for extracting the perfect rhyme is input by a pen from the character string information input part 31, and the character string information is displayed on the character string information display part 62 (step S100 of FIG. 3). Here, for example, the character string of "SARETEIRU" is input by a pen from the character string information input part 31, and "SARETEIRU" is displayed on the character string information display part 62 (see FIG. 7). Then, the information regarding the number of reads of the character string information is displayed on the read number information display part 64 as the number of icons, according to the number of reads of the character string information displayed on the character string information display part 62 (step S200 of FIG. 3). Regarding the character string "SARETEIRU", five icons are displayed on the read number information display part 64 (see FIG. 7). Thereafter, a desired rhyming position and the number of rhymes are designated by referring to the icons displayed on the read number information display part 64 (step S300 of FIG. 3). In the character string "SARETEIRU", two icons positioned at the left are selected, inverted, and displayed (see FIG. 8). Thereafter, a rhyming position is designated based on the retrieved and extracted character string information (step S400 of FIG. 3). In the character string "SARETEIRU", "frontward" is designated, inverted, and displayed (see FIG. 8). Then, dictionary retrieval is carried in the dictionary part 44 by the retrieval section 50 (step S500 of FIG. 3). In the character string "SARETEIRU", the character string which is coincident with "A" and "E" positioned frontward, being the vowel sound or the nasal sound same as two characters "SA" and "RE" positioned frontward, is retrieved and extracted from the dictionary part 44. Results of retrieval and extraction are displayed in a list on the retrieval result display part 66 (step S600 of FIG. 3). Here, when the results are not completely displayed in one screen, "to the next screen" is displayed in a corner of the retrieval result display part 66, and the information not displayed yet is displayed in the next screen and thereafter. The next screen is displayed by operating the page feeding operation part 37. Further, a preceding page is also displayed by operating the page feeding operation part 37.

Figure 4:
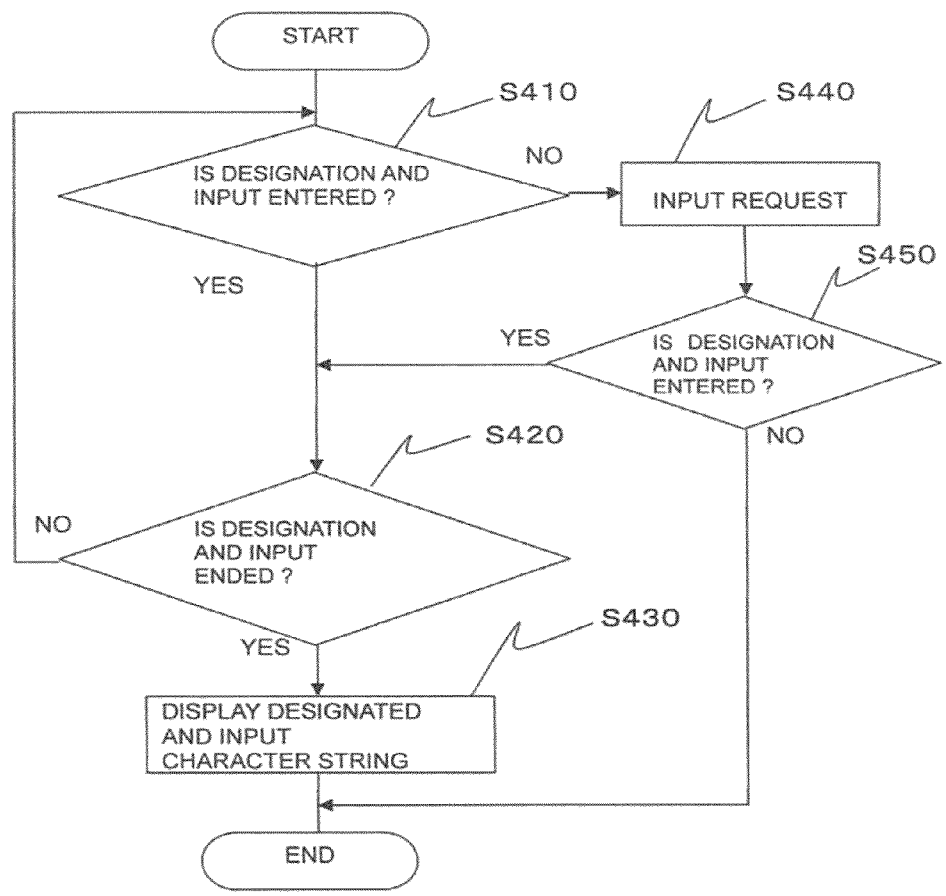
FIG. 4 is a flowchart showing a flow of the processing of designating character string information in a perfect rhyme retrieval processing according to the embodiment.

Here, designation processing of the character string information of step S100 in FIG. 3 will be described in detail with reference to FIG. 4. Specifically, when the character string information, being original data for extracting the perfect rhyme is input (YES in step S110) and all pieces of character string information are input (YES in step S120), the input character string information is displayed on the character string information display part 62 (step S130). In step S110, when the character string information is not input even if a predetermined time is elapsed, or when all pieces of character string information are not input (NO in step S110), a message of an input request is displayed in the corner of the character string information display part 62 or the retrieval result display part 66 (step S140). Thereafter, when the information is not input even if a predetermined time is elapsed (NO in step S150), a message of end of the perfect rhyme processing is displayed, and this processing is ended. When the information is input within a predetermined time (YES in S150), the processing proceeds to step S120.

Figure 5:
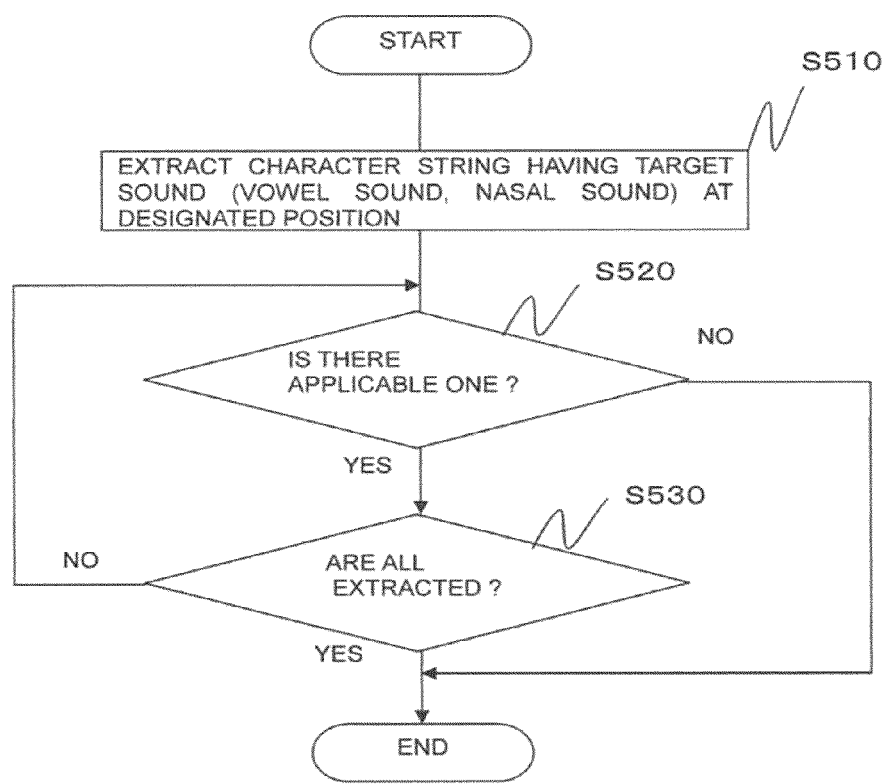
FIG. 5 is a flowchart showing a flow of a processing of dictionary retrieval in the perfect rhyme retrieval processing according to the embodiment.

Further, dictionary retrieval processing of step S500 in FIG. 3 will be described in detail with reference to FIG. 5. Specifically, the retrieval section 50 performs retrieving processing in the dictionary part 44 with reference to the information changed (not changed in some cases) by the positional information changing and designating part 35 when the information input by the designating and inputting part 33 is received. This is a work for extracting the character string having the same vowel sound or the nasal sound (target sound) at a designated position, regarding a total character string stored in the dictionary part 44 (step S510). When there is no corresponding character string (NO in step S520), the processing is ended and N/A (not applicable) is displayed on the retrieval result display part 66. When there is the corresponding character string (YES in step S520), the processing is performed until all corresponding character strings are extracted (step S530).

Figure 9:
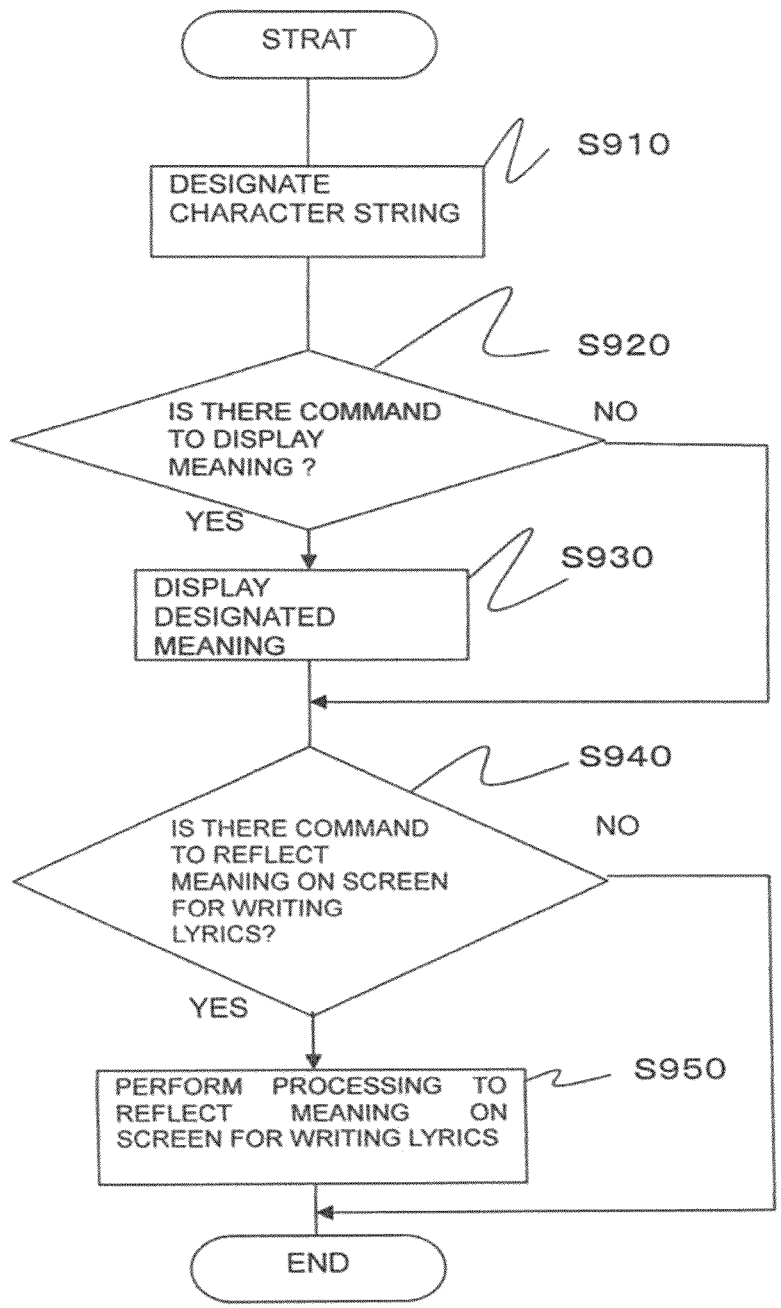
FIG. 9 is a flowchart showing a flow of a processing of a meaning display in the perfect rhyme retrieval processing according to the embodiment.

Incidentally, since the meaning information is added to each converted character string of the character string, desired character string information is selected, designated, and underlined by a pen input from perfect rhymes displayed in a list on the retrieval result display part 66 (step S910 of FIG. 9), and for example, by double-clicking by a pen input (YES in step S920 of FIG. 9), namely, when the meaning information of the perfect rhyme character string is designated and displayed as the meaning information arbitrarily designated by the meaning information designating and displaying part 39, the meaning of the designated character string information is displayed near the character string information (step S930 of FIG. 9). Thereafter, for example, when there is a screen for writing lyrics as another screen and an operation of reflecting the character string information on the screen is designated and input (YES in step S940 of FIG. 9), the character string information is determined and displayed in the screen for writing lyrics (step S950 of FIG. 9).

Figure 10:
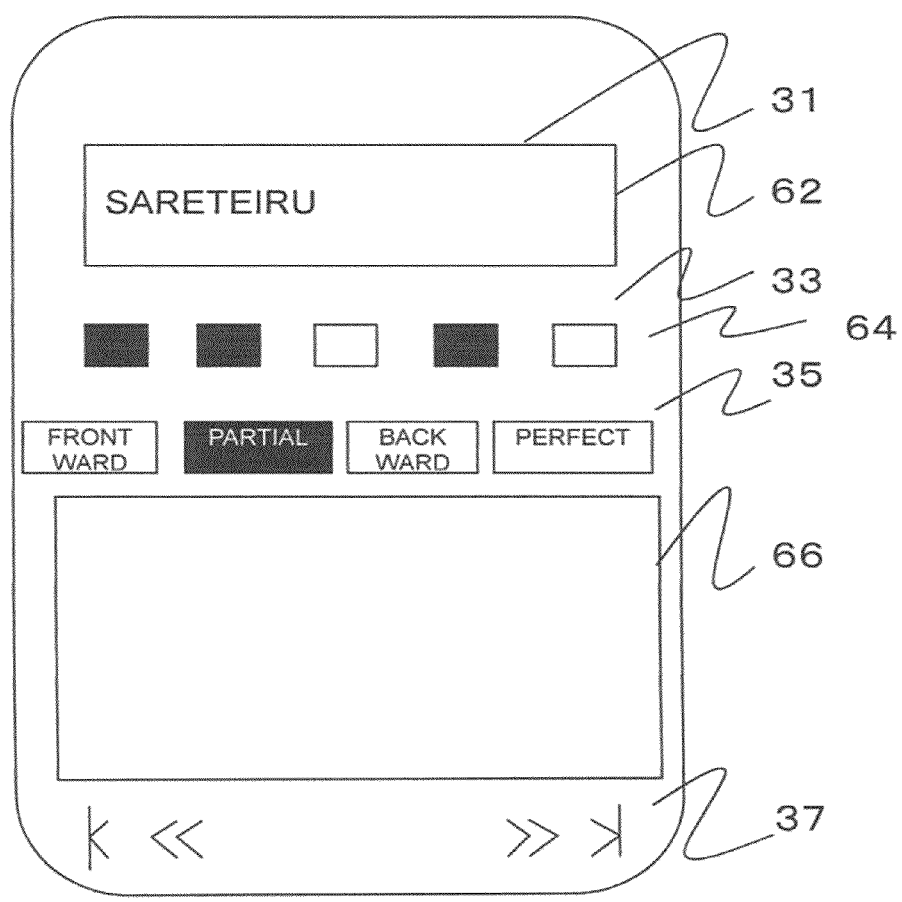
FIG. 10 is a view schematically showing an outer appearance of designating the perfect rhyme different from that of FIG. 8 in the perfect rhyme retrieval processing according to the embodiment.
Figure 11:
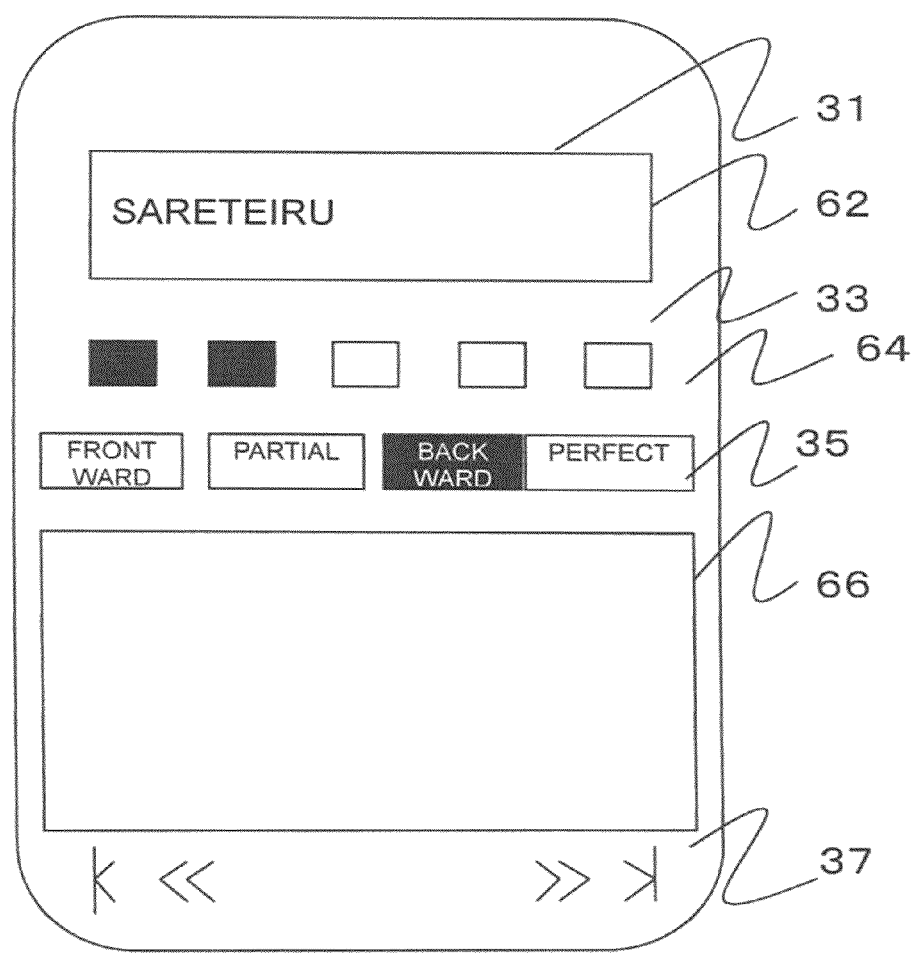
FIG. 11 is a view schematically showing an outer appearance of designating the perfect rhyme different from that of FIG. 8 and FIG. 10 in the perfect rhyme retrieval processing according to the embodiment.

According to the aforementioned embodiment, the operation button of "frontward" is selected and extraction of the character string is carried out regarding two syllable rhymes from the head in the character string "SARETEIRU". However, the embodiment is not limited thereto, and for example, when "partial" is selected in the character string "SARETEIRU", and when two icons from the head and a fourth icon are selected as shown in FIG. 10 (namely, when characters "SA", "RE", "I" are selected), the perfect rhyme is retrieved in such a manner that two syllable rhymes from the head and a fourth syllable rhyme in the character string are retrieved and extracted (namely, a character string having vowel sounds "A", "E", "I" at a designated position is retrieved). Further, as shown in FIG. 11, when the operation button of "backward" is selected and two icons from the head are selected, the perfect rhyme is retrieved in such a manner that the character string having the same vowel sound or the nasal sound (namely, vowel sounds "A", "E") as that of the head two characters (namely, head two characters "SA", "RE") of the character string "SARETEIRU" in which two characters of the end are original data, is retrieved and extracted. Thus, it is a matter of course that various modifications are possible.

Further, the character string, being the original data of the perfect rhyme retrieval, can also be designated by underlining the character string by a pen input from the screen for writing lyrics.

The aforementioned perfect rhyme retrieval according to an embodiment of the present invention is based on Japanese (vowel sounds: "A", "I", "U", "E", "O", and nasal sound: "N"). However, the present invention is not limited to Japanese and can also be applied to all languages by preparing the perfect rhyme dictionary in consideration of the vowel sound information and the nasal sound information of the national language, because not only Japanese but also each national language has the vowel sound and the nasal sound even in a case of English, German, French, and Chinese, etc.

For example, English includes short vowel sounds such as [a], [æ], [ʌ], [ɜ ▪■], [ɔ ▪], [i ▪■], [u ▪], [i■], [ɪ], [e], [u■], [ʊ], etc., and includes double vowel sounds such as [ai], [ei], [ɔɪ], [au], [ou], etc. Further, the nasal sound includes [m], [n], [ŋ]. Such vowel sound information and nasal sound information are associated with the vowel sound information and the nasal sound information of each word in a dictionary in which English words are incorporated, to thereby prepare the rhyming dictionary.

What is claimed is:

1. A perfect rhyme retrieval device comprising:
  a central processing unit;
  a memory;
  a dictionary part that stores character string information added with vowel sound information or nasal sound information or both information;
  a character string information display part that displays the character string information extracted from the dictionary part or the character string information to be input;
  a read number information display part that displays read number information of the character string information displayed on the character string information display part;
  a designating and inputting part that designates and inputs desired positional information to the read number information displayed on the read number information display part;
  a positional information changing and designating part that changeably designates the positional information regarding the positional information extracted from the designating and inputting part;
  a retrieval section that retrieves and extracts the character string information from the dictionary part at a position corresponding to the positional information obtained by referring to the positional information extracted from the positional information changing and designating part, wherein the character string information is coincident with the vowel sound information or the nasal sound information regarding a read of a character corresponding to the positional information extracted from the designating and inputting part; and
  a retrieval result display part that outputs and displays the character string information extracted by the retrieval section.

2. The perfect rhyme retrieval device according to claim 1, wherein
  the dictionary part stores meaning information corresponding to the character string information stored therein, the retrieval section retrieves and extracts the character string information from the dictionary part so as to extract meaning information of the extracted character string information, wherein the character string information is coincident with the vowel sound information or the nasal sound information regarding the read of the character, and the retrieval result display part outputs and displays the meaning information of the character string information extracted by the retrieval section.

3. The perfect rhyme retrieval device according to claim 1, wherein the read number information display part variably displays icons according to the number of reads.

4. The perfect rhyme retrieval device according to claim 2, wherein the read number information display part variably displays icons according to the number of reads.

5. A perfect rhyme retrieval method, comprising:
displaying character string information stored in a dictionary part in which vowel sound information or nasal sound information or both information are stored in association with each other or the character string information to be input;
displaying read number information of the displayed character string information;
designating and inputting desired positional information to the displayed read number information;
changeably setting the positional information regarding the designated and input positional information;
retrieving and extracting the character string information from the dictionary part at a position corresponding to the changeable positional information, wherein the character string information is coincident with the vowel sound information or the nasal sound information regarding a read of a character corresponding to the designated and input positional information; and
outputting and displaying the character string information thus extracted.

6. The perfect rhyme retrieval method according to claim 5, comprising:
storing meaning information corresponding to the character string information, in the character string information which is stored in the dictionary part;
extracting the meaning information of the extracted character string information, when the character string information which is coincident with the vowel sound information or the nasal sound information regarding the read of the character is retrieved and extracted from the dictionary part; and
outputting and displaying the meaning information of the character string information thus retrieved and extracted.

7. The perfect rhyme retrieval method according to claim 5, wherein display of the read number information is set so that icons are variably displayed according to the number of reads.

8. The perfect rhyme retrieval method according to claim 6, wherein display of the read number information is set so that icons are variably displayed according to the number of reads.

9. A computer program embodied in a memory for causing a computer to operate:
a function of storing in a dictionary part, character string information added with vowel sound information or nasal sound information or both information;
a function of displaying the character string information extracted from the dictionary part and the character string information to be input;
a function of displaying read number information of the displayed character string information;
a function of designating and inputting desired positional information to the displayed read number information;
a function of changeably setting the positional information regarding the designated and input positional information;
a function of retrieving and extracting the character string information from the dictionary part at a position corresponding to the positional information obtained by referring to the changeable positional information, wherein the character string information is coincident with the vowel sound information or the nasal sound information regarding the read of a character corresponding to the designated and input positional information; and
a function of outputting and displaying the extracted character string information.

10. The program according to claim 9, wherein the dictionary part includes:
a function of storing meaning information corresponding to the stored character string information;
a function of extracting the meaning information of the extracted character string information, when the character string information which is coincident with the vowel sound information or the nasal information regarding the read of the character is retrieved and extracted from the dictionary part; and
a function of outputting and displaying the meaning information of the character string information thus retrieved and extracted.

11. The program according to claim 9, wherein display of the read number information is set so that icons are variably displayed according to the number of reads.

12. The program according to claim 10, wherein display of the read number information is set so that icons are variably displayed according to the number of reads.

13. A non-transitory computer readable recording medium recording a computer program for causing a computer to operate:
a function of storing in a dictionary part, character string information added with vowel sound information or nasal sound information or both information;
a function of displaying the character string information extracted from the dictionary part or the character string information to be input;
a function of displaying read number information of the displayed character string information;
a function of designating and inputting desired positional information to the displayed read number information;
a function of changeably setting the positional information regarding the designated and input positional information;
a function of retrieving and extracting the character string information from the dictionary part at a position corresponding to the positional information obtained by referring to the changeable positional information, wherein the character string information is coincident with the vowel sound information or the nasal sound information regarding a read of a character corresponding to the designated and input positional information; and
a function of outputting and displaying the extracted character string information.

14. The computer readable recording medium recording the program according to claim 13, wherein the dictionary part realizes:
a function of storing meaning information corresponding to the stored character string information;

a function of extracting the meaning information of the extracted character string information, when the character string information which is coincident with the vowel sound information or the nasal sound information regarding the reads of the character is retrieved and extracted from the dictionary part; and a function of outputting and displaying the meaning information of the retrieved and extracted character string information.

15. The computer readable recording medium recording the program according to claim 13, wherein display of the read number information is set so that icons are variably displayed according to the number of reads.

16. The computer readable recording medium recording the program according to claim 14, wherein display of the read number information is set so that icons are variably displayed according to the number of reads.

17. A perfect rhyme retrieval device comprising:
a central processing unit;
a memory;
a dictionary means for storing character string information added with vowel sound information or nasal sound information or both information;
a character string information display means for displaying the character string information extracted from the dictionary means or the character string information to be input;
a read number information display means for displaying read number information of the character string information displayed on the character string information display means;
a designating and inputting means for designating and inputting desired positional information to the read number information displayed on the read number information display means;
a positional information changing and designating means for changeably designating the positional information regarding the positional information extracted from the designating and inputting means;
a retrieval means for retrieving and extracting the character string information from the dictionary means at a position corresponding to the positional information obtained by referring to the positional information extracted from the positional information changing and designating means, wherein the character string information is coincident with the vowel sound information or the nasal sound information regarding a read of a character corresponding to the positional information extracted from the designating and inputting means; and
a retrieval result display means for outputting and displaying the character string information extracted by the retrieval means.

18. The perfect rhyme retrieval device according to claim 17, wherein
the dictionary means for storing meaning information corresponding to the character string information stored therein,
the retrieval means for retrieving and extracting the character string information from the dictionary means so as to extract meaning information of the extracted character string information, wherein the character string information is coincident with the vowel sound information or the nasal sound information regarding the read of the character, and
the retrieval result display means for outputting and displaying the meaning information of the character string information extracted by the retrieval means.

19. The perfect rhyme retrieval device according to claim 17, wherein the read number information display means for variably displaying icons according to the number of reads.

20. The perfect rhyme retrieval device according to claim 18, wherein the read number information display means for variably displaying icons according to the number of reads.

* * * * *